No. 758,965. Patented May 3, 1904.

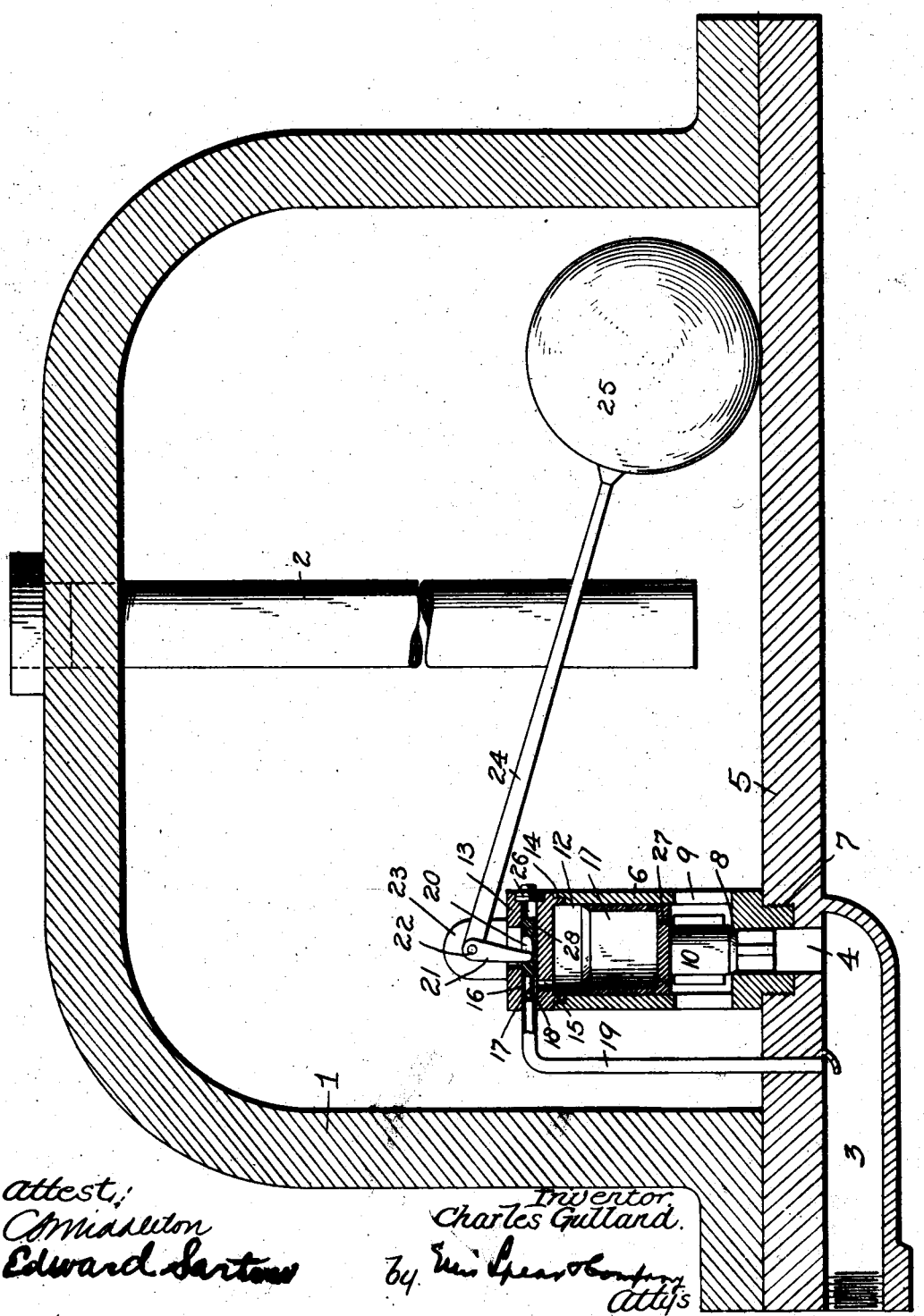

UNITED STATES PATENT OFFICE.

CHARLES GULLAND, OF PITTSBURG, PENNSYLVANIA.

STEAM-TRAP.

SPECIFICATION forming part of Letters Patent No. 758,965, dated May 3, 1904.

Application filed July 30, 1903. Serial No. 167,646. (No model.)

*To all whom it may concern:*

Be it known that I, CHARLES GULLAND, a citizen of the United States, residing at Pittsburg, Pennsylvania, have invented certain new and useful Improvements in Steam-Traps, of which the following is a specification.

My invention relates to steam-traps, and particularly to the valve mechanism used therein, my object being to provide controlling means for the discharge-valve of the trap whereby the said valve will be quickly opened when the condensation-water within the trap reaches a predetermined level, thus preventing injury to the valve which would otherwise occur were the valve gradually opened and subjected during this time to the action of the rapidly-discharging water.

The invention consists of the features and combination and arrangement of parts hereinafter described, and particularly pointed out in the claim.

The accompanying drawing shows my invention in vertical section with some of the parts in elevation.

In the drawing the casing of the trap 1 is of ordinary form, having an inlet 2 and an outlet 3, the latter extending from an opening 4 in the bottom 5 of the trap. Connected to the bottom of the trap over the opening 4 is a valve-casing 6, having a screw-threaded lower end 7 seated in the bottom 5 and extending vertically from the said bottom within the trap. The casing has a valve-seat 8 and lateral openings 9, forming the communication between the valve-seat and opening 4 and interior of the trap. The main valve consists of a plug 10, adapted to the seat 8 and extending vertically therefrom, said plug having attached thereto at its upper end a piston portion 11, fitted to move vertically in the cylinder 12, forming the upper part of the valve-casing. The head 13 of this cylinder is screw-threaded therein, as at 14, and has an opening 15, affording communication between the cylinder and a recess or bore 16, extending horizontally through the head from side to side, forming a chamber in which a supplemental valve 17 is adapted to reciprocate. This valve is adapted to a seat 18, leading from its chamber and communicating through a pipe 19 with the main discharge-passage 3. The main portion of the supplemental valve fits its chamber snugly to be guided therein, and it is provided with an enlarged recess 20, receiving the end of an arm 21, pivoted at 22 to the ear of the lug 23, extending up from the head of the valve-casing. The arm 21 is connected with a float-arm 24, carrying a float 25. The chamber or bore in which the supplemental valve is located is closed at one end by the screw-plug 26. A port 27 is formed through the piston 11 of the main valve, so that the upper side of the said piston is always in communication with the interior of the trap.

Supposing the parts to be in the position shown and the water of condensation rising in the trap, the float 25 will rise, but some of its motion will be lost and without effect by reason of the enlarged space or recess 20 in the supplemental valve; but when the predetermined height of water has been reached the arm 21 will strike the wall of the recess and operate the supplemental valve, opening the same and relieving the pressure on the upper side of the piston 11, which pressure has been equal to that in the trap because of the open communication between the interior of the trap and the upper side of the piston through the opening 27, and thus it will be seen that upon the operation of the supplemental valve and the consequent release of pressure from the upper side of the main-valve piston the pressure from the interior of the trap acting on the lower face of the piston will lift the same and open the main valve for the discharge of the condensation-water, and it will be seen that this opening action takes place quickly and completely when the predetermined water-level has been reached in the trap. After the water has been discharged and the float has fallen the supplemental valve will have closed, and the pressure from the trap will pass through the opening 27 to the upper side of the main-valve piston, and the pressure then being equalized the said main valve will close upon its seat by gravity. It will be understood, of course, that lost motion of the float occurs during its fall, as well as during its elevation, and therefore there will be no tendency for the main valve to close until the water has been discharged from the trap.

An equalizing-port 28 is formed in the supplemental valve extending longitudinally thereof, so that the pressure will be equalized at the opposite ends of the said supplemental valve. It will be understood that the port 27 is always open and the function of the supplemental valve is simply to hold and release the pressure from the upper side of the main-valve piston, which pressure is supplied through the said open port 27.

I claim as my invention—

In combination with a steam-trap, a valve-casing disposed vertically therein, a valve movable vertically in said casing and having a piston moving in a cylinder formed in the casing, a head closing the upper end of the said cylinder and having a laterally-extending bore or chamber therein, a discharge-conduit leading from one end of said chamber, the said head having a port connecting the said chamber with the cylinder of the main valve, a supplemental valve in the said chamber controlling the port leading to the discharge-conduit and a float for controlling the supplemental valve, substantially as described.

In testimony whereof I affix my signature in presence of two witnesses.

CHARLES GULLAND.

Witnesses:
JOHN F. COURSON,
JAMES SMITH.